United States Patent [19]

Atsuchi

[11] 4,118,765
[45] Oct. 3, 1978

[54] AUTOMOBILE HEADLIGHTS

[76] Inventor: Toru Atsuchi, 3-15-1, Morisaki, Yokosuka-City Kanagawa-Ken, Japan

[21] Appl. No.: 765,802

[22] Filed: Feb. 4, 1977

[30] Foreign Application Priority Data

Feb. 23, 1976 [JP] Japan .................................. 51-18620

[51] Int. Cl.² ............................................. B60Q 1/12
[52] U.S. Cl. ...................................... 362/384; 362/71
[58] Field of Search .............. 240/62.2, 62 H, 62 A, 240/62 B, 62 R, 41.6, 8.24, 8.25, 62.5; 362/40, 66, 71, 233, 285, 288, 306, 401, 402, 428, 384, 269, 277

[56] References Cited

FOREIGN PATENT DOCUMENTS

| | | | |
|---|---|---|---|
| 820,387 | 11/1951 | Fed. Rep. of Germany | 240/62.2 |
| 111,053 | 8/1925 | Switzerland | 240/62.2 |
| 154,379 | 7/1932 | Switzerland | 240/62.2 |

Primary Examiner—Miller J D
Assistant Examiner—Peter S. Wong
Attorney, Agent, or Firm—Michael J. Striker

[57] ABSTRACT

A headlight arrangement for a vehicle is provided, comprising a support frame fastened to the vehicle, a lamp turnably mounted on said support frame, said lamp having a beam radiation range, and a mechanism operative for automatically turning said lamp in dependence upon the direction in which the vehicle is steered to correspondingly adjust said beam radiation range.

13 Claims, 5 Drawing Figures

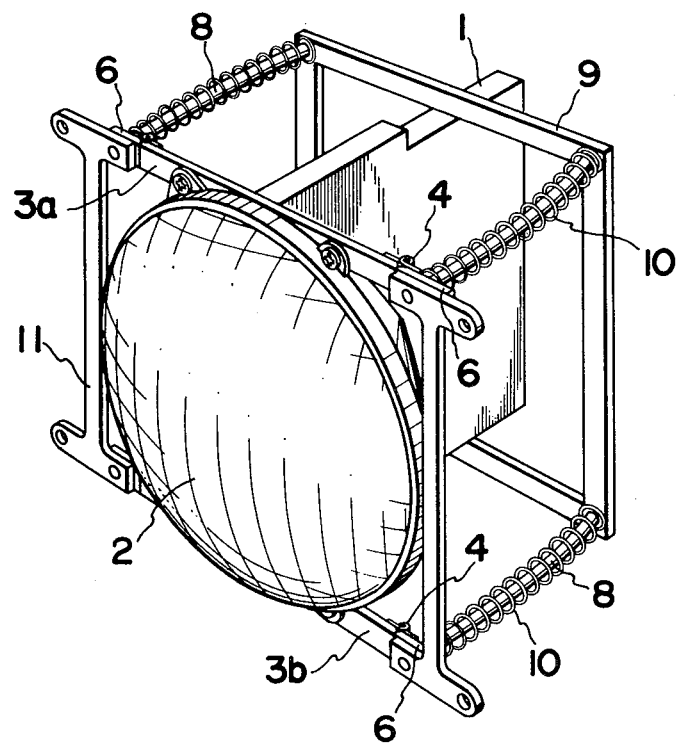
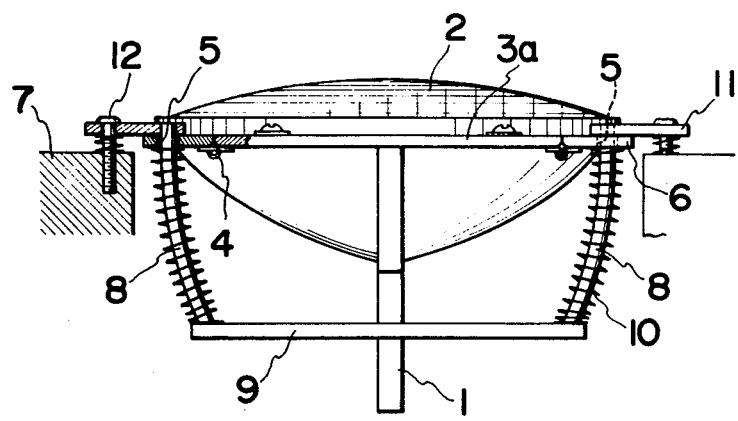

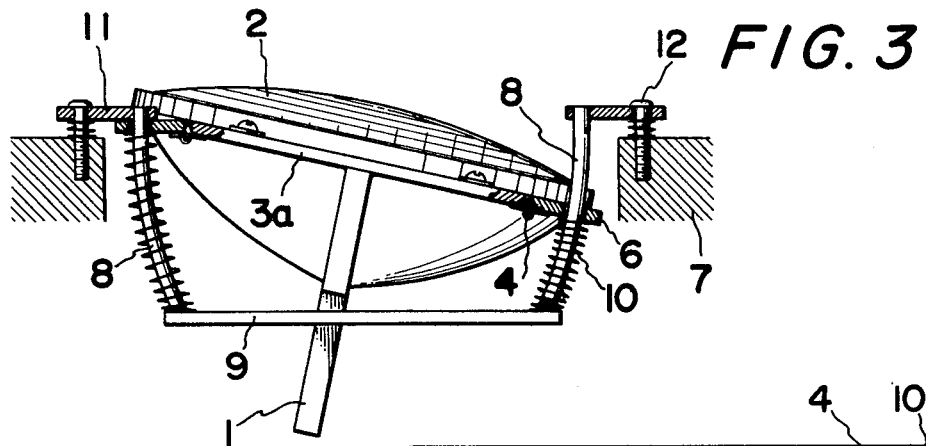
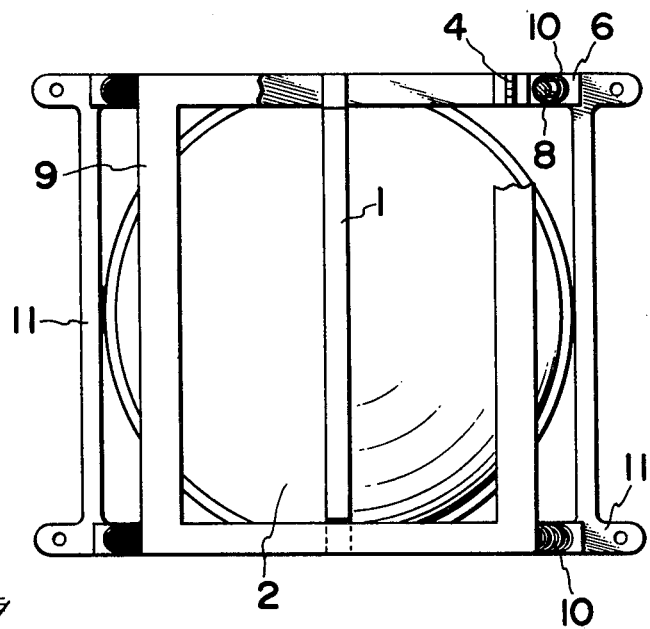
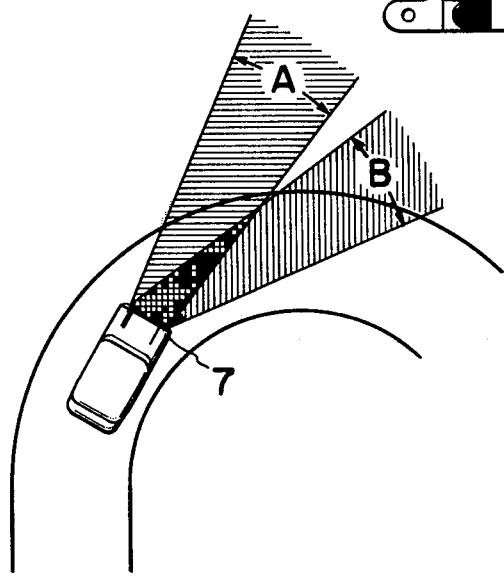

AUTOMOBILE HEADLIGHTS

BACKGROUND OF THE INVENTION

Conventional automobile headlights are immovably secured to the front part of vehicle bodies. Their lamp bodies are also installed with their beam axes fixed in the straight forward direction of the vehicle so that the beam direction is always in alignment with the vehicle direction and there is no possibility of changing the beam direction independently of the vehicle direction.

Therefore, with these conventional headlights, even when the vehicle is steering along a curve, the beam is directed straight ahead. This means that when automobiles are steering along a sharp curve such as a hairpin curve or when they are steering along a curve at high speeds, the road ahead of the vehicle is left dark so there is a great danger of missteering and a consequent accident.

SUMMARY OF THE INVENTION

The primary object of the present invention is to provide headlights, especially automobile headlights, which adjust their beam direction to the direction of a vehicle's steering along a curved road. Another object of the present invention is to provide automobile headlights which direct their beam towards the direction of the vehicle's steering without delay so as to expedite the finding of obstacles on the road ahead. A further object of the present invention is to provide automobile headlights which swivel their body in order to change their beam direction through the utilization of centrifugal force, so that no manipulation is required on the part of the automobile driver. A still further object of the present invention is to provide automobile headlights which return their beam direction to the original direction straight ahead of the vehicle through utilization of centrifugal force working on the automobile so that no manipulation is required on the part of the automobile driver. Still another object of the present invention is to provide automobile headlights which are secured to the vehicle body and which have lamp members mounted with horizontal swiveling freedom so that the light beam can change its direction to the direction of the vehicle.

A particular feature of the headlights, according to the present invention, follows from their structure. The invented structure enables the beam direction to be changed towards the curve direction always before the vehicle body has completed turning along curves.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF DRAWINGS

Now, the present invention will be described with reference to the attached drawings.

FIG. 1 is a perspective view of the headlight according to the present invention;

FIG. 2 is a vertial view of the same headlight;

FIG. 3 is a vertical view of the same headlight showing the position it takes when the automobile is in the process of rightward steering;

FIG. 4 is a rear view of the headlight according to the present invention; and

FIG. 5 shows the comparison of the radiating ranges between the conventional headlights and the headlights constructed in accordance with the present invention, wherein A represents the beam radiation range of conventional headlights and B represents the beam radiation range of headlights based on the present invention.

DESCRIPTION OF THE PREFERRED EMBODIMENTS

Figure 6:
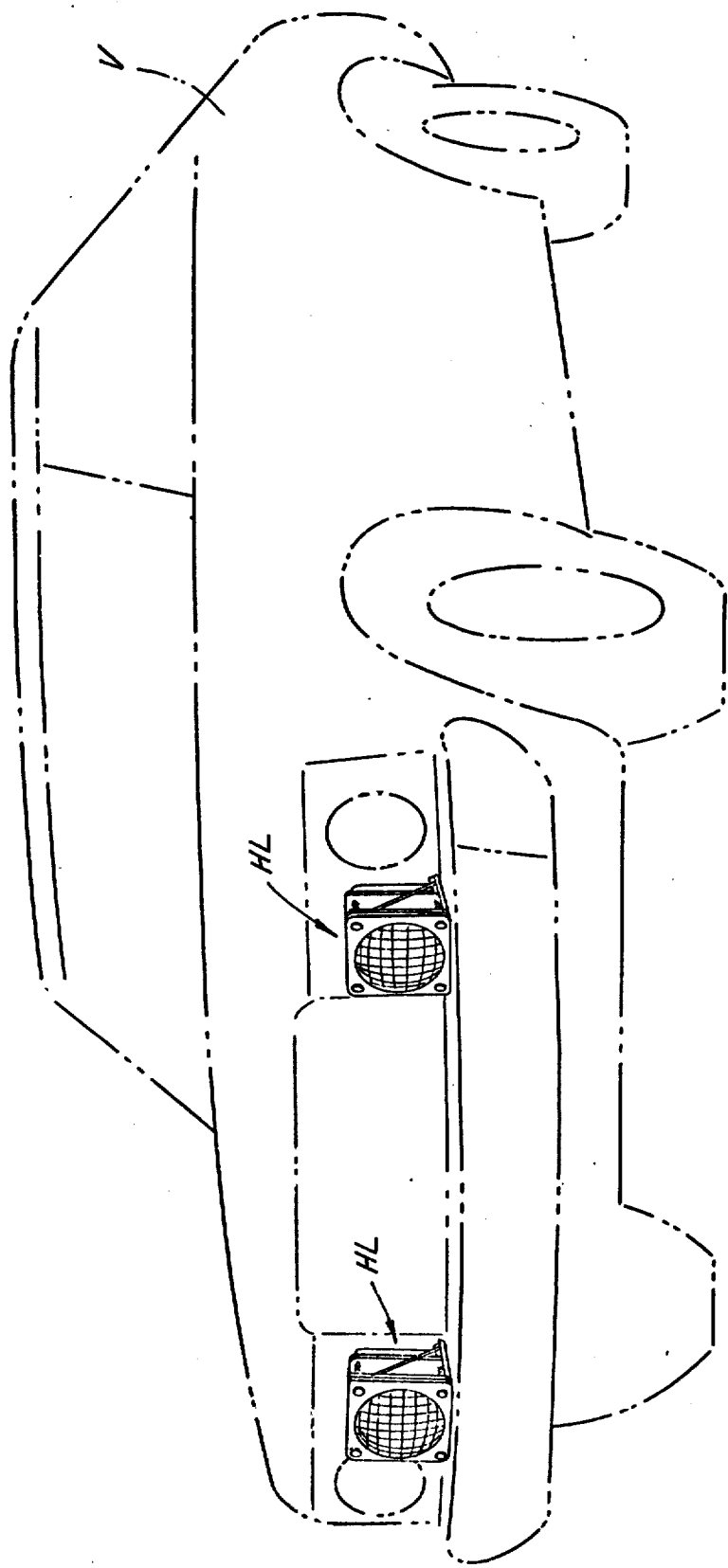

The headlight arrangement according to the present invention has a rudder or balance bar 1 projecting rearward and is attached to the lamp body 2. A lamp body 2 is fixed to the inside of cross or mounting bars 3a and 3b. These mounting bars 3a, 3b have at each of their ends hinges 4 and slide pieces 6. Each of the slide pieces 6 has one small bore 5 through which said slide pieces are guided along at least one pair of curved rails 8 fixed to the vehicle body 7. These curved rails 8 are provided with springs 10 which exert a resilient repelling force between slide pieces 6 and the rear support frame 9 so as to keep slide pieces 6 in close contact with the front support frame 11 in the absence of operative centrifugal force, but to allow only one of the slide pieces to keep such contact with the front support frame 11 while the vehicle moves along a curve.

In FIG. 3, the headlight based on the present invention is mounted on the vehicle body 7 by means of adjustable screws 12.

The working principle of the headlight based on the present invention will be described below.

While an automobile is running in a straight direction, according to the present invention, the springs 10 exert a resilient force pressing the respective slide pieces 6 against the front support frame 11, and the headlight beams are directed straightly forward.

When the steering wheel is turned in either direction and the vehicle body starts to change its direction, centrifugal force starts to act on the vehicle body; therefore the direction of the rudder 1 projecting from the lamp body is changed. When the direction of the rudder 1 is altered, one of the slide pieces 6 moves toward the rear support frame 9, consequently compressing the spring 10.

Meanwhile, the other slide piece 6 remains in contact with the front support frame 11. The hinge 4 attached to this contacting slide piece is bent and the lamp body 2 is directed towards the turning direction of the vehicle (FIG. 3).

Because springs 10 surround the curved rails 8, the mounting bars and the slide pieces can easily swivel through the hinges 4. Furthermore, because the small bores 5 in the slide pieces 6 have a narrow clearance between the bore wall and the curved rails 8, the slide pieces 6 slide smoothly.

When the curving vehicle straightens its direction, centrifugal force disappears. Therefore, the slide pieces 6 are pushed by springs 10 towards the front support frame 11, the lamp body 2 is directed straight ahead of the vehicle, and the slide pieces 6 are kept in contact with the front support frame 11.

The headlight based on the present invention is characterized in that it can adapt its light beam direction to the steering direction of the vehicle, and it can always radiate its light beam slightly in advance of the vehicle turning in the direction of vehicle turning. Therefore, the presently invented headlight improves the forward visibility in curve steering, enhances driving safety, reduces traffic accidents, and illuminates the approach of the vehicle to oncoming traffic efficiently.

Vehicle headlights based on the present invention may be installed on any conventional passenger cars, buses, trucks and other automobiles, and because the headlights do not require any machining or other modifications on the front side of the vehicle, the appearance of the cars is not damaged by its mounting. Because of the utilization of centrifugal force by the presently invented headlights for the adjustment of the light beam direction, the driver is not required to make any manual operation. Furthermore, if the presently invented headlights are mounted as auxiliary headlights, supplementating the main headlights of the conventional design, safety is greatly improved and illuminatory effects are increased.

It will be understood that each of the elements described above, or two or more together, may also find a useful application in other types of headlights differing from the types described above.

While the invention has been illustrated and described as embodied in a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be patented by Letters Patent is set forth in the appended claims.

1. A headlight arrangement comprising a rear support; a front support spaced from the rear support; two spaced rails each extending between and being fixed to the supports; a headlight; slidable mounting means for slidably mounting the headlight on each of the rails; and two springs each surrounding a respective one of the rails and each having one end pressing against the rear support and another end pressing against the mounting means to thereby bias the mounting means to a position against the front support, whereby the headlight responds to centrifugal force by sliding on one of the rails and in the direction of the rear support to thereby compress the respective spring which subsequently presses the mounting means back to the position against the front support when the centrifugal force diminishes while the headlight remains substantially stationary on the other rail with the front support preventing a corresponding expansion of the other spring and thereby at least substantially preventing an aftereffect of swinging when centrifugal force is diminished.

2. The headlight arrangement of claim 1, the headlight including a frontwardly directed source of light and a rear portion connected to the frontwardly directed source; and further comprising a balance bar having a predetermined weight and being connected to the rear portion, said balance bar swinging in response to centrifugal force and thereby turning the headlight.

3. The headlight arrangement of claim 1, said mounting means comprising a bar slidably mounted on the rails.

4. The headlight arrangement of claim 1, said mounting means comprising a cross bar having two ends and being connected to the headlight; two slide pieces, each slidably mounted on a respective one of the rails, each slide piece having an aperture through which the respective rail passes; and two hinges each connected to one of the respective slide pieces and to one of the respective ends of the cross bar.

5. The headlight arrangement of claim 1, the rails being curved.

6. The headlight arrangement of claim 5, the rails being substantially progressively curved towards each other in the direction towards the rear support.

7. The headlight arrangement of claim 2, the rear support being a substantially rectangular frame wherein the balance bar projects within the rectangular frame of the rear support; and further comprising two additional rails, each of the four rails extending from a location substantially at one of the corners of the rear support, wherein said mounting means comprises two generally horizontally orientable spaced cross bars each having two opposite ends, two pairs of hinges each pair being connected to a respective one of the cross bars and each hinge of each pair being connected to a respective one of the opposite ends, and four slide pieces each having an aperture through which one of the rails extends and each being connected to a respective one of the hinges, and wherein the headlight is fixed to the two cross bars; and two additional springs, each of the four springs surrounding a respective one of the four rails and each spring having one end pressing against the rear support and another end pressing against a respective one of the slide pieces to thereby bias the slide pieces to a position against the front support, said springs and rails being generally horizontally orientable.

8. The headlight arrangement of claim 1, each of the spaced springs being maintained free from a pulling force directed through another spring so as to thereby avoid an aftereffect of swinging when centrifugal force is diminished.

9. The headlight arrangement of claim 1, said springs being spaced from each other and being maintained free from contact with each other.

10. A headlight arrangement comprising a rear support substantially immovably connectable to a vehicle body; a headlight which swivels in response to centrifugal force; two spaced springs located in a position intermediate and in close contact with the headlight and the rear support; maintaining means for holding said springs in said position; and means for directing swiveling of a headlight against one of the springs so as to thereby compress the same when the headlight swivels in response to centrifugal force while simultaneously maintaining the other spring at least substantially free from any elongation and compression, whereby an aftereffect of swinging subsequent to diminishment of centrifugal force is prevented.

11. A headlight arrangement for a vehicle, comprising a support frame fastened to the vehicle, a lamp turnably mounted on said support frame, said lamp having a beam radiation range, and means operative for automatically turning said lamp is dependence upon the direction in which the vehicle is steered to correspondingly adjust said beam radiation range, wherein said turning means comprises means subjected to centrifugal force produced during turning of the vehicle and operative for effecting said turning as a function of the centrifugal force, means for biasing said lamp towards a predetermined position corresponding to orientation of said beam radiation range in the direction straight ahead of the vehicle, and a support frame having a front and rear support section, a plurality of mounting bars, said lamp being connected to said mounting bars for horizontal swiveling, a plurality of slide pieces, each having a small guide boring, a plurality of hinges connecting said slide pieces to ends of said mounting bars, and a plurality of curved rails, each having two ends, one end being fastened to said rear support section and the other end being passed through a respective one of said borings and being fastened to said front support section, and said biasing means comprising a plurality of springs, each surrounding the length of a respective one of said curved rails between said rear support section and said slide piece, said springs exerting biasing force sufficient to maintain close contact between said slide pieces and said front support section in the absence of centrifugal force but insufficient to maintain such contact relative to at least one of said slide pieces in the presence of centrifugal force.

12. A headlight arrangement for a vehicle, comprising a support frame fastened to the vehicle; a lamp turnably mounted on said support frame, said lamp having a beam radiation range; and means operative for automatically turning said lamp is dependence upon the direction in which the vehicle is steered to correspondingly adjust said beam radiation range, wherein said turning means comprises means subjected to centrifugal force produced during turning of the vehicle and operative for effecting said turning as a function of the centrigual force, means for biasing said lamp towards a predetermined position corresponding to orientation of said beam radiation range in the direction straight ahead of the vehicle, and a support frame having a front and rear support section, two mounting bars, each connected to said lamp body for horizontal swiveling movement, a rudder connected to said lamp body, four slide pieces, each having a small guide boring, four hinges connecting said slide pieces to ends of said mounting bars, and four curved rails, each having two ends, one end being fastened to said rear support frame section and the other end being passed through a respective one of said borings and being fastened to said front support frame section, said biasing means comprising four springs, each surrounding the length of a respective curved rail between said rear support section and said slide piece, whereby said springs exert a biasing force sufficient to maintain close contact between said slide pieces and said front support section in the absence of centrifugal force but insufficient to maintain such contact relative to at least one of said slide pieces in the presence of centrifugal force.

13. A headlight arrangement as defined in claim 12, further comprising stationary headlights for supplementary illumination.

* * * * *

UNITED STATES PATENT AND TRADEMARK OFFICE
CERTIFICATE OF CORRECTION

PATENT NO. : 4,118,765
DATED : October 3, 1978
INVENTOR(S) : Toru Atsuchi

It is certified that error appears in the above-identified patent and that said Letters Patent are hereby corrected as shown below:

Column 2, line 2, delete "and".

Column 2, line 8, after "invention" and before the period, add the following:

-- and FIG. 6 is a perspective view, showing the headlight according to the invention installed on an automobile --.

Column 2, line 30, after "screws 12." add -- See also FIG. 6 which shows the vehicle in broken lines. --

On the title page, below the Abstract "5 Drawing Figures" should read -- 6 Drawing Figures --.

In the drawing, add FIG. 6 as attached hereto.

Signed and Sealed this

Eleventh Day of December 1979

[SEAL]

Attest:

SIDNEY A. DIAMOND

Attesting Officer

Commissioner of Patents and Trademarks